US011287796B2

(12) United States Patent
Bierweiler et al.

(10) Patent No.: US 11,287,796 B2
(45) Date of Patent: Mar. 29, 2022

(54) DIAGNOSTIC DEVICE AND METHOD FOR MONITORING A TECHNICAL PLAN

(71) Applicant: Siemens Aktiengesellschaft, Munich (DE)

(72) Inventors: Thomas Bierweiler, Karlsruhe (DE); Daniel Labisch, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 245 days.

(21) Appl. No.: 16/460,639

(22) Filed: Jul. 2, 2019

(65) Prior Publication Data

US 2020/0012257 A1    Jan. 9, 2020

(30) Foreign Application Priority Data

Jul. 3, 2018  (EP) .................................. 18181470

(51) Int. Cl.
*G05B 19/406* (2006.01)
*G05B 13/02* (2006.01)

(52) U.S. Cl.
CPC ....... *G05B 19/406* (2013.01); *G05B 13/0265* (2013.01); *G05B 2219/33034* (2013.01)

(58) Field of Classification Search
CPC .............. G05B 19/406; G05B 13/0265; G05B 2219/33034; G05B 23/024; G05B 19/0428; G05B 2219/24024; G06N 3/088
See application file for complete search history.

(56) References Cited

U.S. PATENT DOCUMENTS

| 10,768,188 B2* | 9/2020 | Bierweiler ....... G01N 35/00584 |
| 2007/0225836 A1* | 9/2007 | Swanson ................ G05B 17/02 700/45 |
| 2009/0070047 A1* | 3/2009 | Swanson ................ G05B 17/02 702/32 |

(Continued)

FOREIGN PATENT DOCUMENTS

| EP | 2472440 | 7/2012 |
| EP | 3232282 | 10/2017 |

(Continued)

OTHER PUBLICATIONS

Somervuo Panu et al: "Self-Organizlng Maps and Learning Vector Quantization for Feature Sequences", Neural Processlng Letters, pp. 151-159, XP055540386, Boston, DOI: 10.1023/A:1018741720065, found on Internet: URL:http://cis.legacy.ics.tkk.fi/panus/papers/dtwsorn.pdf; the whole document; 1999.

*Primary Examiner* — Ziaul Karim
(74) *Attorney, Agent, or Firm* — Cozen O'Connor (57) ABSTRACT

A diagnostic device for monitoring the operation of a technical plant with an automation system, wherein the diagnostic device includes a data memory in which at least one data set characterizing the operation of the plant with values of process variables can be stored, and an evaluation device, where the diagnostic device is characterized in that the evaluation device is configured to determine a diagnostic statement about the operation of the technical plant based on the data set and at least one self-organizing map and based on a program for controlling a sequence during the operation of the technical plant with repeatedly traversed step sequences via a Dynamic Time Warping method.

5 Claims, 6 Drawing Sheets

(56) References Cited

U.S. PATENT DOCUMENTS

| | | | |
|---|---|---|---|
| 2013/0138288 A1* | 5/2013 | Nickolaou | B60W 40/13 |
| | | | 701/23 |
| 2013/0138388 A1 | 5/2013 | Jain et al. | |
| 2016/0259328 A1* | 9/2016 | Heiler | G05B 23/0205 |
| 2017/0308056 A1 | 10/2017 | Bierweiler et al. | |
| 2018/0031587 A1 | 2/2018 | Bierweiler et al. | |

FOREIGN PATENT DOCUMENTS

| | | | |
|---|---|---|---|
| EP | 3279756 | 2/2018 | |
| EP | 3279756 A1 * | 2/2018 | G05B 23/0221 |

* cited by examiner

| # Step | Measured value | \multicolumn{15}{c|}{Test data} |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| | | 1.0 | 1.0 | 7.8 | 4.0 | 1.0 | 1.0 | 1.0 | 1.0 | 1.0 | 1.0 | -1.7 | -7.9 | -3.6 | 1.0 | 1.0 |
| 1 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 2 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 3 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 4 | 10.3 | 9.3 | 9.3 | 2.5 | 6.3 | 9.3 | 9.3 | 9.3 | 9.3 | 9.3 | 9.3 | 12.1 | 18.3 | 13.9 | 9.3 | 9.3 |
| 5 | 6.7 | 5.7 | 5.7 | 1.1 | 2.7 | 5.7 | 5.7 | 5.7 | 5.7 | 5.7 | 5.7 | 8.4 | 14.7 | 10.3 | 5.7 | 5.7 |
| 6 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 7 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 8 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 9 | -4.8 | 5.8 | 5.8 | 12.7 | 8.8 | 5.8 | 5.8 | 5.8 | 5.8 | 5.8 | 5.8 | 3.1 | 3.1 | 1.3 | 5.8 | 5.8 |
| 10 | -8.3 | 9.3 | 9.3 | 16.1 | 12.3 | 9.3 | 9.3 | 9.3 | 9.3 | 9.3 | 9.3 | 6.5 | 0.3 | 4.7 | 9.3 | 9.3 |
| 11 | 1.2 | 0.2 | 0.2 | 6.7 | 2.8 | 0.2 | 0.2 | 0.2 | 0.2 | 0.2 | 0.2 | 2.9 | 9.1 | 4.7 | 0.2 | 0.2 |
| 12 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 13 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 14 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 15 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| SUM | | | | | | | | | | | | | | | | 15.9 |

Training data 1

FIG 5

| # Step | Measured value | Test data 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | | 1.0 | 1.0 | 7.8 | 4.0 | 1.0 | 1.0 | 1.0 | 1.0 | 1.0 | 1.0 | -1.7 | -7.9 | -3.6 | 1.0 | 1.0 |
| 1 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 2 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 3 | 8.7 | 7.7 | 7.7 | 0.9 | 4.7 | 7.7 | 7.7 | 7.7 | 7.7 | 7.7 | 7.7 | 10.5 | 16.7 | 12.3 | 7.7 | 7.7 |
| 4 | 5.0 | 4.0 | 4.0 | 2.8 | 1.0 | 4.0 | 4.0 | 4.0 | 4.0 | 4.0 | 4.0 | 6.7 | 12.9 | 8.6 | 4.0 | 4.0 |
| 5 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 6 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 7 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 8 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 9 | -4.7 | 5.7 | 5.7 | 12.5 | 8.7 | 5.7 | 5.7 | 5.7 | 5.7 | 5.7 | 5.7 | 2.9 | 3.3 | 1.1 | 5.7 | 5.7 |
| 10 | -5.9 | 6.9 | 6.9 | 13.7 | 9.9 | 6.9 | 6.9 | 6.9 | 6.9 | 6.9 | 6.9 | 4.2 | 2.0 | 2.3 | 6.9 | 6.9 |
| 11 | 3.1 | 2.1 | 2.1 | 4.7 | 0.9 | 2.1 | 2.1 | 2.1 | 2.1 | 2.1 | 2.1 | 4.8 | 11.1 | 6.7 | 2.1 | 2.1 |
| 12 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 13 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 14 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| 15 | 1.0 | 0.0 | 0.0 | 6.8 | 3.0 | 0.0 | 0.0 | 0.0 | 0.0 | 0.0 | 0.0 | 2.7 | 8.9 | 4.6 | 0.0 | 0.0 |
| SUM | | | | | | | | | | | | | | | | 11.3 |

Training data 2

FIG 6

DIAGNOSTIC DEVICE AND METHOD FOR MONITORING A TECHNICAL PLAN

BACKGROUND OF THE INVENTION

1. Field of the Invention

The invention relates to a diagnostic device for monitoring the operation of a technical plant, a method for monitoring the technical plant with a step-by-step process sequence, a computer program with program code instructions which can be executed by a computer, a storage medium with a computer program which can be executed by the computer and to a computer system.

2. Description of the Related Art

In manufacturing and process engineering plants, technical sequences are frequently controlled by step sequences (sequence cascades) or batch recipes. The sequence of the individual steps may be subject to fluctuations caused by both production and errors. For reliable operation and fulfillment of qualitative goals, monitoring of sequences is necessary. In this case, unusual deviations from the normal fluctuations must be distinguished. In particular, in pharmaceutical processes, the sequence of which is determined by biological processes, there may also be strong, temporal fluctuations of the process sequence.

A common method for monitoring manipulated variables and measured values is the display of time series (trend display). Monitoring is performed either by the user, which presupposes broad experience and a high level of attentiveness. As the size of the plant increases, the user inevitably reaches their limits.

Hitherto automated monitoring has only been possible to a limited extent and via a parameterization of fixed limits. However, this parameterization is very complex. In addition, deviations of a plurality of variables that occur within the parameterized limits cannot be detected.

Methods for automated monitoring based on self-organizing maps are known.

EP 3 232 282 A1 discloses a diagnostic device for monitoring a technical plant with an automation system. The diagnostic device uses a self-organizing map to determine the duration of certain execution steps of the technical plant.

EP 2 472 440 A1 discloses a method for monitoring a state of a process plant that uses self-organizing maps.

EP 3 232 282 A1 discloses a diagnostic device for monitoring the operation of a technical plant with an automation system, where the diagnostic device comprises a data memory in which at least one data set characterizing the operation of the plant can be stored, and an evaluation device. The evaluation device is designed to detect and display a deviation of the time behavior during the passage of the step sequence to be checked from the time behavior during error-free passes by evaluating the data set on the basis of the self-organizing map.

However, the referenced methods are unsuitable if only the dynamics differ within a step, but both the value ranges and the occurring signal value combinations match.

SUMMARY OF THE INVENTION

It is an object of the invention to provide a method for monitoring manipulated variables and measured values of a technical plant which can be performed reliably and in an automated manner with a relatively low outlay.

This and other objects and advantages are achieved in accordance with the invention by a diagnostic device for monitoring the operation of a technical plant using an automation system, where the diagnostic device comprises a data memory in which at least one data set reproducing the operation of the plant can be stored with values of process variables, and an evaluation device.

The diagnostic device is characterized in that the evaluation device is configured to determine a diagnostic statement about the operation of the plant based on the data set and at least one self-organizing map and based on a program for controlling the sequence during operation of the plant with repeatedly traversed step sequences via a Dynamic Time Warping method.

The technical plant can be a plant from the process industry such as a chemical, or pharmaceutical, petrochemical plant, or a plant from the food and beverage industry. This also includes any plants from the production industry, plants in which, for example, cars or goods of all kinds are produced. Technical plants that are suitable for performing the method in accordance with the invention can also be from the field of power generation. Wind turbines, solar plants or power plants for power generation are also covered by the term technical plant.

These plants each have a control system or at least one computer-aided module for controlling and regulating the process or production that is taking place. Part of the control system or control module or a technical plant is at least one database or archive in which historical data is stored.

Technical processes are controlled in the technical plant by "step sequences", which can also be referred to as sequence cascades. A step sequence represents a sequence of processing or production steps defined by a program for controlling the operation sequence. The values of process variables in the execution of the individual steps may be subject to both production-related and error-related fluctuations. The monitoring of the steps is therefore helpful for detecting deviations and errors.

Step sequences are implemented by a program for controlling the operating sequence which runs, for example, in an automation device. In the steps of the step sequences, manipulated variables are usually set, which are used to intervene in the process running on the plant. The transition to the next step of a step sequence is either purely time-controlled or, as is usually the case, when certain set points are reached by one or more measured variables. Hidden behind the manipulated variables and the measured variables that are used in the control program for checking transition conditions is process knowledge that was introduced, for example, by a process technician or chemical engineer in the engineering of the automation system, in particular when creating the program for controlling the sequence during operation of the plant (in particular via the programming language Sequential Function Chart (SFC).

The diagnostic device is configured to automatically determine an n-tuple with n coordinates in an automatic learning process for each node of the self-organizing map that represents all error-free passes of the step sequence used for training, where each coordinate represents a value of a process variable, i.e., a manipulated or measured variable of a step automatically determined as relevant for diagnosis during the training process.

The set manipulated variables or detected measured values of the individual steps of a step sequence are therefore used as input variables during the training of the self-organizing map. The process variables may vary in different passes, even if no error occurs. Accordingly, in order to train the self-organizing map, values of the process variables of a plurality of well-executed passes of the step sequences are used as training data.

The self-organizing map stores typical values of the process variables for the individual steps as good values during training at each node. At the beginning of the training process, for example, an 8×12 node map can be used. Naturally, variables deviating from this can also be used. After training, the training data can be used to check the map size. If the map is too large, the individual nodes of the map are not affected by the training data or only on a few occasions. If a map has been found to be too large, a somewhat smaller map size can be selected in the next learning process and the learning process can be started anew. If the map has not been found to be too large, a larger map can be selected in the next learning process and the learning process can be started anew. This process is repeated until the boundary has been determined to another map that is too large. The next smallest map that is not too large is used.

The Dynamic Time Warping method is also known by the German name "Dynamische Zeitnormierung". The method determines the most appropriate time step of a second data set for each time step of a data set according to a specific pattern.

It is also an object of the invention to provide a method for monitoring a technical plant using a step-by-step process sequence, in particular a processing plant, where historical data of a process step which has already been repeatedly executed on the technical plant can be retrieved and evaluated, where the process step has a plurality of temporal sub-steps.

The method comprises the following steps:
a) The acquisition of manipulated variables, measured values, decision variables and measurable disturbance variables that can be tapped as historical data of the technical plant in the framework of completed passes of the process step;
b) The training of the previously acquired data in at least one self-organizing map, where nodes of the self-organizing map represent individual temporal sub-steps of the passes of the process step;
c) The determination of a tolerance range for the manipulated variables, measured values, decision variables and measurable disturbance variables for each node of the at least one self-organizing map;
d) The performance of a new passage of the process step on the technical plant and detection of the current manipulated variables, measured values, decision variables and measurable disturbance variables;
e) For each temporal sub-step of the newly executed process step, the determination of a node of the self-organizing map corresponding to the respective temporal sub-step via a distance measure and via a Dynamic Time Warping method; and
f) A comparison of the newly executed process step with the self-organizing map, as to whether each temporal sub-step of the newly executed process step is within the tolerance range of the respective corresponding node.

Provided that historical data of a repeatedly executed process step is present (cf. process step a), in step b) a self-organizing map is taught. In each case, the relevant signals (manipulated variables, measured variables, decision variables and measurable disturbances) of a temporal sub-step of the entire process step are stored in the nodes of the self-organizing map. A process step may be, for example, an SFC step or a recipe step.

In process step c), permissible tolerances for the total clearance and also for each individual manipulated or measured variable are determined for each node of the self-organizing map. Determination can, for example, occur as described in EP 3 232 282 A1. However, it is also possible, for example, to provide a fixed percentage distance value (e.g., 20%) that serves as a tolerance measure for the data stored in the node.

The trained self-organizing map with the permissible tolerances can be stored locally in the plant or in a cloud environment, for example, in an SQL database.

After the training of the map and the determination of the tolerances, the process step is run through again. To compare the data of the process step with the historical data, each temporal sub-step is compared via a distance measure, in particular via an Euclidian distance, and via the Dynamic Time Warping method with the self-organizing map.

In this case, advantageously, first the passage of the process step is determined which, viewed across all the sub-steps, has the lowest Euclidean distance measure, weighted via the Dynamic Time Warping method, compared to the newly executed run of the process step. Subsequently, the node of the self-organizing map having the least distance measure to the (old) passage of the process step is determined. For more information regarding details of the Dynamic Time Warping method, reference is made to the description of the exemplary embodiment.

One or more associated nodes of the self-organizing map are obtained as an intermediate result for each (temporal) sub-step of the process step.

In the last step of the method in accordance with the invention, each temporal sub-step of the newly executed process step is checked to see whether it is in the tolerance range of the respective node of the self-organizing map corresponding to it. If this is the case, it may be assumed that the newly executed process step corresponds to a "good case", i.e., no anomalies have occurred. In the reverse case, an anomaly in the technical plant is to be assumed.

Overall, a diagnostic statement about the operation of the technical plant is obtained by applying the method in accordance with the invention.

The use of the Dynamic Time Warping method permits a temporal extension of the process. On the other hand, changes in the amplitudes are recognized as errors. Combining the Dynamic Time Warping method with self-organizing maps makes it possible to determine thresholds for anomalies from historical data without manual parameterization, to evaluate the temporal sequence of a recipe step and still be able to evaluate the process tolerant to temporal shifts.

In contrast to the simulation of a rigorous process model, the complexity for the modeling is eliminated completely. The training process of the self-organizing map can advantageously be completely automated so that no parameters need be specified by the user.

It should be understood modifications to the parameters remain possible so that a person skilled in the art could possibly improve the result. The resulting reduction of the engineering or commissioning effort is the prerequisite for the widespread use of such a function. In contrast to data-based linear dynamic models, the self-organizing map can also map a complex non-linear behavior in conjunction with the curves. The only prerequisite is that the training data is representative of all operating modes and events occurring during operation.

Advantageously, the described function provides anomaly detection at the same time. If the entirety of a batch/SFC step does not fit the self-organizing map, taking into account temporal shifts, compressions and extensions of the executing speed of the process, then the current behavior deviates from the learned one. This can be reported as an anomaly.

If, on the other hand, it is a good behavior that is merely not included in the learning data, the learning data can be supplemented by new good data and the learning can be repeated with the extended data set.

The method in accordance with the invention can of course also be performed in a plurality of different process steps in a sequential or parallel processing manner.

In an advantageous embodiment of the invention, the tolerance range (process step c) is determined in an automated manner such that all historical data used for training the self-organizing map lies within the tolerance range. It is thus possible to completely automate the determination of the tolerance range in a simple manner.

It is also an object of the invention to provide a computer program with program code instructions which can be executed by a computer for the implementation of the method in accordance with the invention.

It is a further object of the invention is to provide a storage medium having a computer program which can be executed by a computer and a computer system, on which a computer program in accordance with the invention is implemented.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The characteristics, features and advantages of this invention, as well as the manner in which they are achieved, will become clearer and better understood in connection with the following description of the exemplary embodiments, which will be described in connection with the figures, in which.

DETAILED DESCRIPTION OF THE EXEMPLARY EMBODIMENTS

Figure 1:
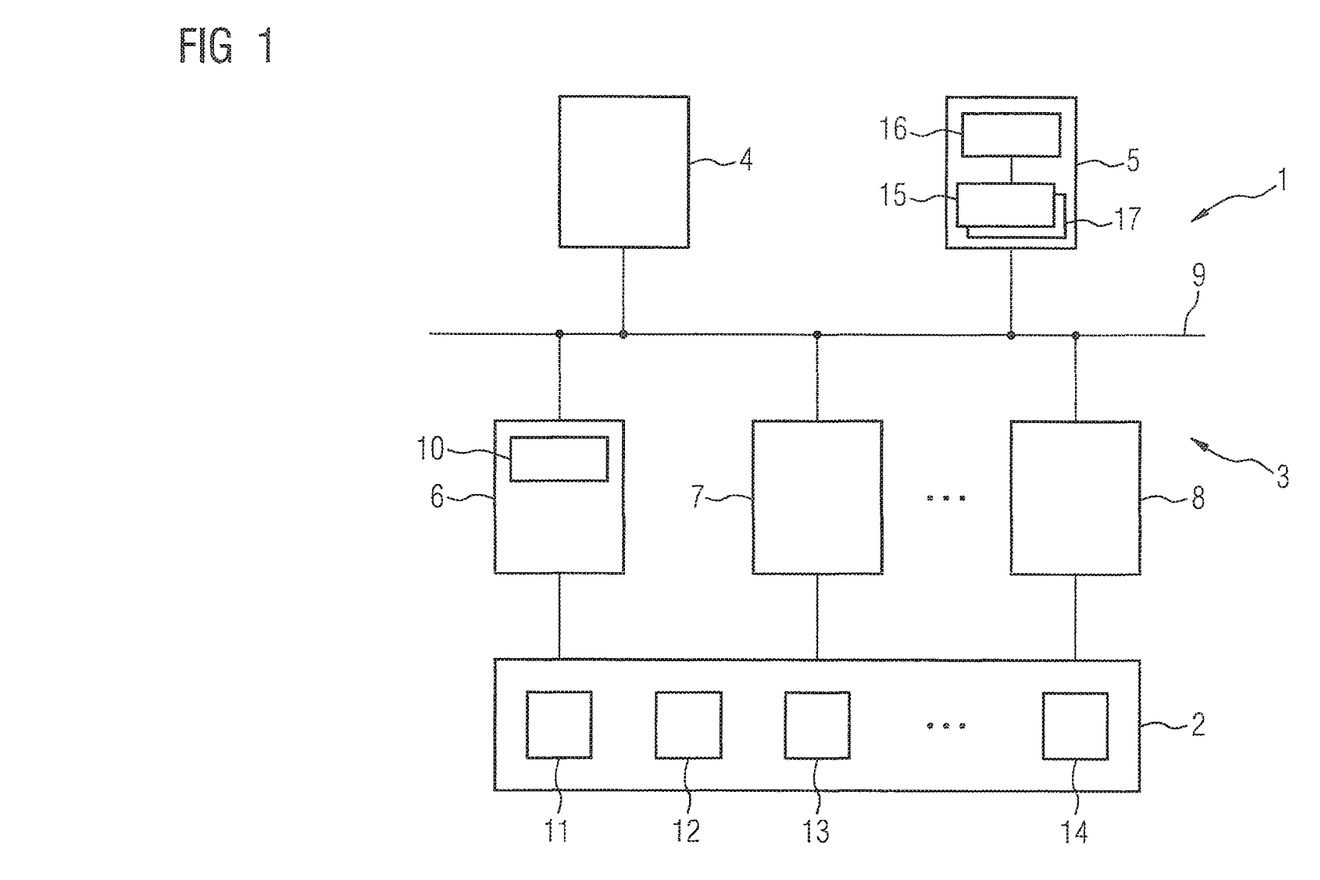
FIG. 1 shows a schematic illustration of a process engineering plant.

FIG. 1 shows, in a simplified schematic representation, an exemplary process engineering plant 1 in which a process 2 is controlled via an automation system 3. The automation system 3 contains a planning and engineering tool 4, an operating and monitoring device 5 and a plurality of automation devices 6, 7, 8, which are connected to one another via a bus system 9 for data communication. The automation devices 6, 7, 8 control the technical process 2 in accordance with automation programs, of which an automation program 10 is shown by way of example in FIG. 1. The automation program 10, for example, usually consists of several functional modules that may interact with other functional modules distributed in the automation system 3. To control the process 2, a variety of field devices 11, 12, 13, 14 are used for process instrumentation. Measuring transducers are used to detect process variables, such as temperature, pressure, flow rate, level, density or gas concentration of a medium. With actuators, the process sequence can be influenced in accordance with detected process variables, for example, according to the specifications of the automation program 10. Examples of actuators that may be mentioned are a control valve, a heater or a pump. In order to monitor the operation of the plant 1, a plurality of data sets, which are characteristic of the operation of the plant, are detected and stored in a data memory 15. Using an evaluation device 16, the data sets containing execution times of individual steps of step sequences are evaluated to determine and display a diagnosis statement to a user so that appropriate measures can be taken for error handling.

In the technical plant 1, technical sequences are controlled via step sequences that can also be referred to as sequence cascades. A step sequence represents an operational sequence of processing or production steps that is stored, for example, in an automation program.

The values of process variables during the execution of the individual steps may be subject to fluctuations caused by both production and errors. Monitoring the steps is therefore helpful for detecting deviations and errors. To monitor the operation of the plant 1, a plurality of data sets that are characteristic of the operation of the plant 1 are detected and stored in a data memory 15. However, not all process variables that are used in the technical plant 1 are helpful in determining a reliable diagnostic statement.

In order to automatically determine the process variables relevant for the diagnosis, a program 17 for controlling the sequence in the operation of the plant 1 is analyzed via an evaluation device 16. The program 17 can, for example, correspond to the source code of the total existing sequence controls in the automation devices 6, 7, 8. In the analysis of the program 17, it is determined, in particular, which manipulated variables are set in steps of the step sequences and/or which measured variables are queried in steps of the step sequence for checking a transition condition.

The process variables thus determined are each assigned a coordinate in the n-tuples that form the data sets. Furthermore, with the evaluation device 16, it is possible to automatically determine input and output variables, for example, of functional modules, which are also of importance for the process 2 running on the plant 1 and are included in the diagnosis in a corresponding manner.

With the evaluation device 16, data sets of a plurality of good passes of the step chain are first evaluated and a self-organizing map is trained. In this way, corresponding n-tuples with predetermined values of process variables are obtained at the nodes of the self-organizing map for error-free passes of the step sequence. The self-organizing map that is predetermined in this way is used in the subsequent operation of the plant 1 to determine a diagnostic statement about the operation of the plant 1. Here, data sets containing values of process variables for the respective execution time of individual steps of sequence cascades are evaluated by the evaluation device 16. The diagnostic statement can be archived, for example, in a log file and/or displayed to a user so that appropriate measures for error handling can be taken.

Figure 2:
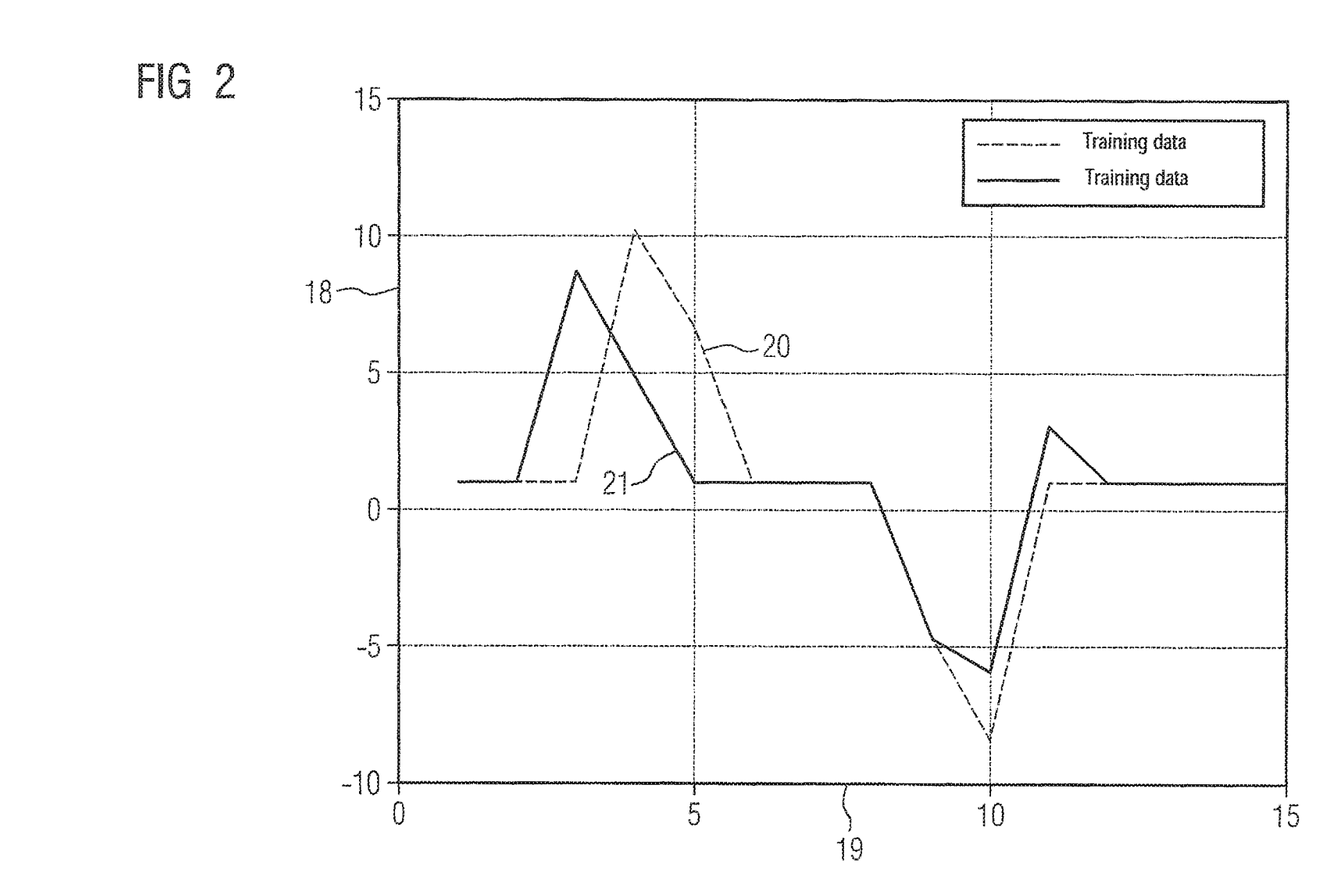
FIG. 2 is a graphical plot of a first temporal course of two passes of a process step in accordance with the invention.

Hereinafter, an exemplary method in accordance with the invention is explained. In the example, only one measured value of any process step is shown. However, the method is suitable for very many measured values. FIG. 2 shows two good data sets 20, 21 (in the legend of the diagram shown in FIG. 2 also referred to as training data 1 (reference character 20) and training data 2 (reference character 21)). The good data sets 20, 21 are represented by a horizontal time axis 19 (with an arbitrary time unit) and a vertical value axis 18 (with an arbitrary unit). The range of the horizontal time axis 19 extends from 0 to 15, the range of the vertical value axis 18 from −10 to +15.

The training data 20, 21 is used in accordance with the invention to train the self-organizing map, to determine the tolerances and to identify the time sequence paths.

Figure 3:
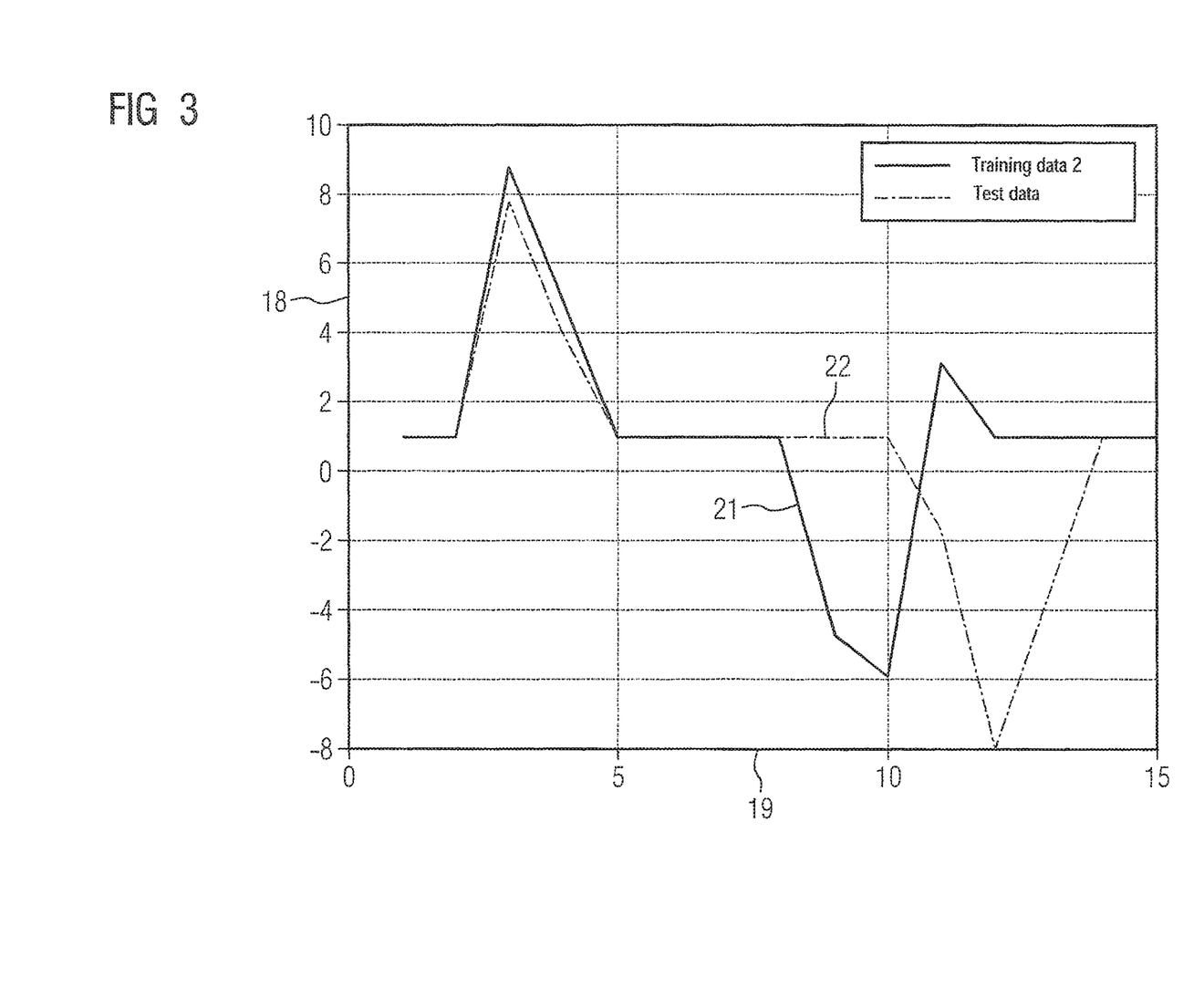
FIG. 3 is a graphical plot of a second temporal course of two passes of a process step in accordance with the invention.

FIG. 3 shows a data set 22 of the newly executed process step (referred to in the legend as "test data") in comparison with the training data 21 (or "training data 2"). The two data sets 21, 22 are shown, comparable to FIG. 2, via a horizontal time axis 19 (with an arbitrary time unit) and a vertical value axis 18 (with an arbitrary unit). The range of the horizontal time axis 19 extends from 0 to 15, the range of the vertical value axis 18 from −10 to +15.

In the subsequent step, a node of the self-organizing map corresponding to the respective temporal sub-step is determined via the Dynamic Time Warping method for each temporal sub-step of the newly executed process step. In this case, the time unit on the horizontal axis 19 in FIG. 3 corresponds to a temporal sub-step. Accordingly, FIG. 3 (and FIG. 2) shows fifteen individual sub-steps of the respective data sets 21, 22.

Figure 4:
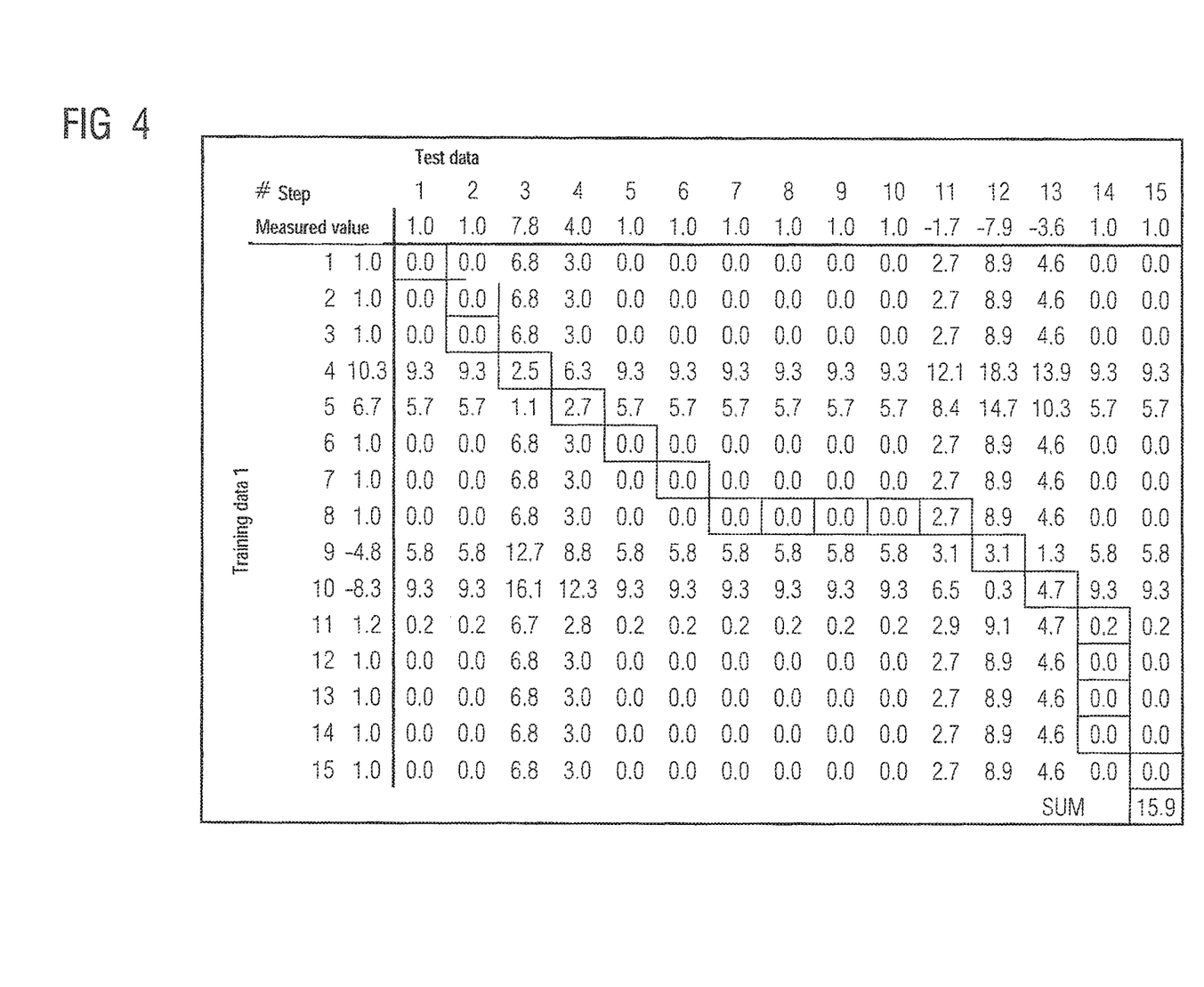
FIG. 4 shows a first matrix-like comparison of two passes of a process step in accordance with the invention.
Figure 5:
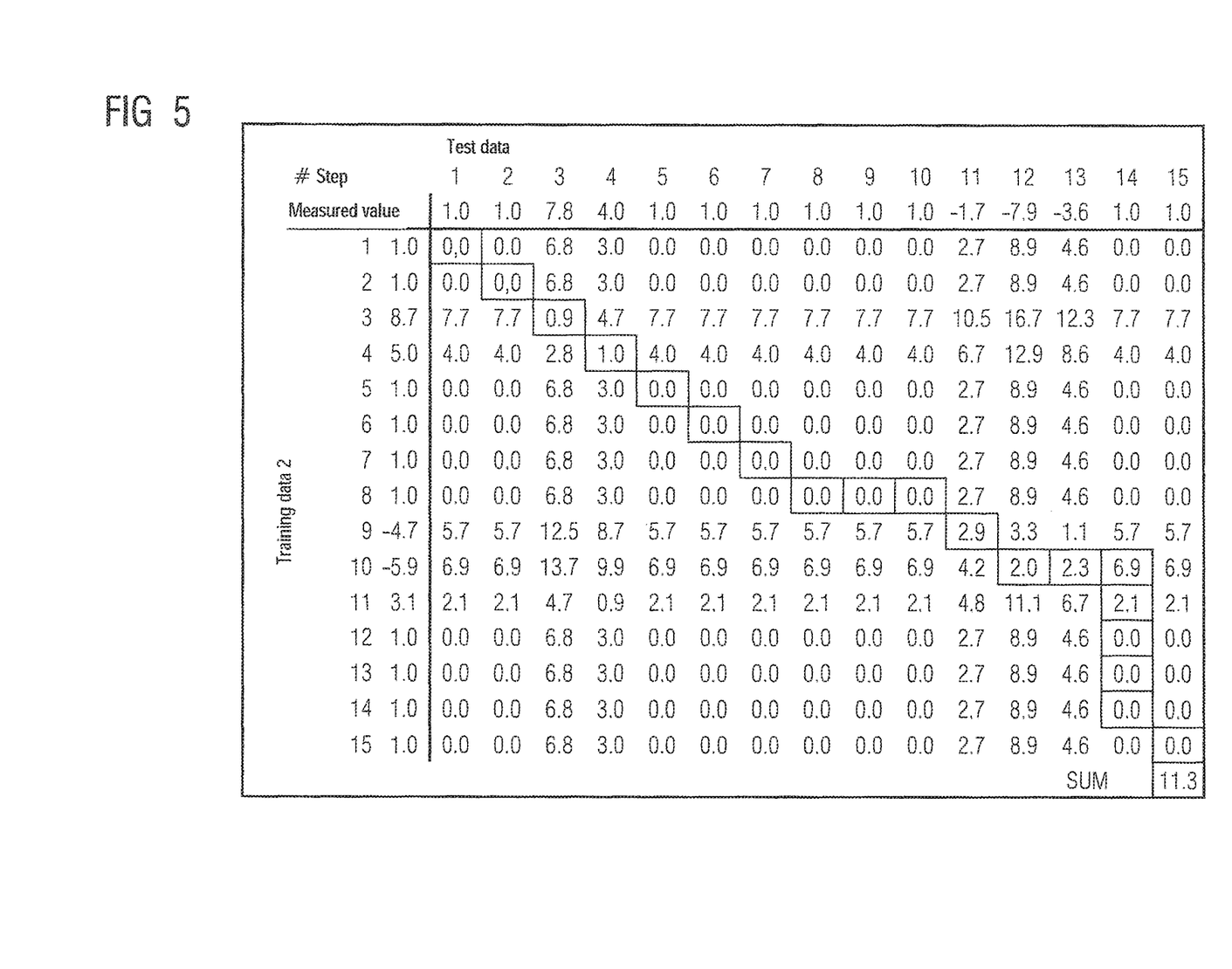
FIG. 5 shows a second matrix-like comparison of two passes of a process step in accordance with the invention.

A data matrix is shown in each case in FIG. 4 and FIG. 5. In FIG. 4 the fifteen individual sub-steps of the training data 20 ("training data 1") and the data set 22 of the newly traversed process step ("test data") are shown with respect to one another. The training data 20 is represented in the vertical, the data set of the newly executed process step in the horizontal. The individual matrix elements each represent the Euclidean distance between the two data sets.

The Dynamic Time Warping method identifies the sub-step of the training data 20 that is suitable for each sub-step of the data record of the newly executed process step based on a calculation method not specified in more detail in this context (this is shown outlined in each case in FIG. 4). A sum function produces a total deviation measure of the data set of the newly executed process step from the training data 20.

The method explained above with reference to FIG. 4 is performed, as it were, with the training data 21, the associated comparison matrix being illustrated in FIG. 5.

A comparison of the two total deviations ("11.3" in comparison to "15.9") reveals that the training data 21 has the lower deviation compared with the data set of the newly executed process step. The training data 21 is therefore considered as a reference data set. With a further distance calculation, particularly via the Euclidean distance, the nodes of the self-organizing map that best suit each individual sub-step of the training data 21 are identified.

In the last step, the deviations from the values of the previously determined corresponding nodes are determined for the individual temporal sub-steps of the data set of the newly executed process step. Here, whether the values of the data set of the newly executed process step lie individually and in total within the tolerance range of the respective node is determined. An anomaly can be determined, for example, via a cost function over all measured values and a single symptom via a deviation of the individual measured values.

Figure 6:
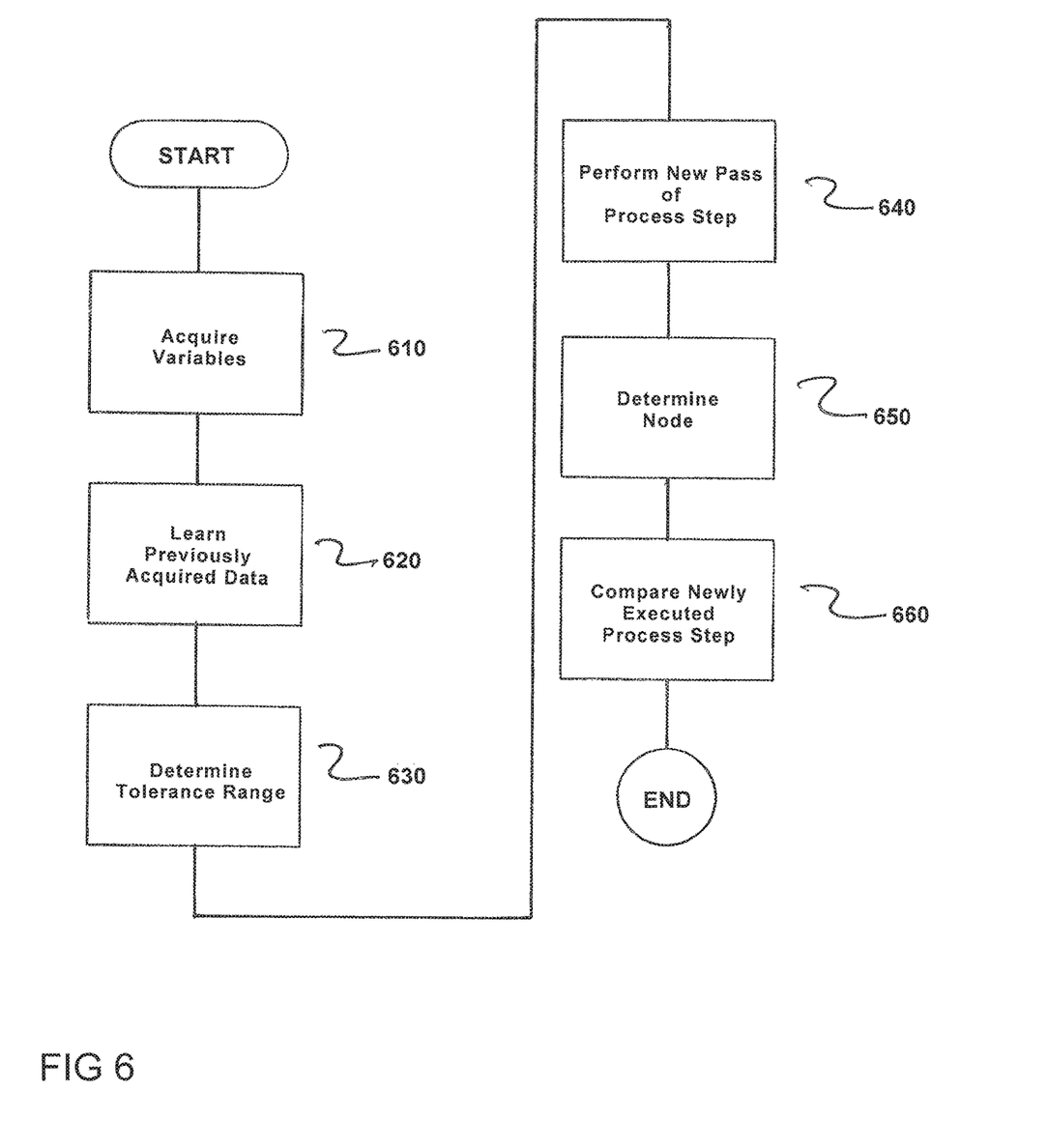
FIG. 6 is a flowchart of the method in accordance with the invention.

FIG. 6 is a flowchart of the method for monitoring a technical plant, where historical data of a process step have previously been repeatedly executed on the technical plant being retrievable and evaluatable, and the process step includes a plurality of temporal sub-steps. The method comprises acquiring manipulated variables, measured values, decision variables and measurable disturbance variables which are tapable as historical data of the technical plant with a framework of completed passes of the process step, as indicated in step 610. Next, previously acquired data in at least one self-organizing map are learned, as indicated in step 620. In accordance with the invention, nodes of the at least one self-organizing map represent individual temporal sub-steps during a pass of the process step.

Next, a tolerance range is determined for the manipulated variables, measured values, decision variables and measurable disturbance variables for each node of the at least one self-organizing map, as indicated in step 630.

Next, a new passage of the process step is performed on the technical plant and detecting the current manipulated variables, measured values, decision variables and measurable disturbance variables are detected, as indicated in step 640.

Next, for each temporal sub-step of the newly executed process step, a node of the at least one self-organizing map corresponding to a respective temporal sub-step via a distance measure and via a Dynamic Time Warping method is determined, as indicated in step 650.

Next, the newly executed process step is compared with the at least one self-organizing map, to determine whether each temporal sub-step of the newly executed process step is within a tolerance range of the respective corresponding node, as indicated in step 660.

Although the invention has been further illustrated and described in detail by the preferred exemplary embodiment, the invention is not limited by the disclosed example, and other variations can be derived therefrom by a person skilled in the art without departing from the scope of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A diagnostic device for monitoring an operation of a technical plant with an automation system, the diagnostic device comprising:
    a data memory in which at least one data set characterizing the operation of the technical plant with values of process variables is storable; and an evaluation device;
wherein the evaluation device is configured to:
- determine a diagnostic statement with respect to the operation of the technical plant based on the at least one data set, at least one self-organizing map and a program for controlling a sequence during the operation of the technical plant with repeatedly traversed step sequences via a Dynamic Time Warping method;
- acquire manipulated variables, measured values, decision variables and measurable disturbance variables which are tapable as historical data of the technical plant with a framework of completed passes of a process step;
- learn previously acquired data in said at least one self-organizing map, nodes of the at least one self-organizing map representing individual temporal sub-steps during a pass of the process step;
- determine a tolerance range for the manipulated variables, measured values, decision variables and measurable disturbance variables for each node of the at least one self-organizing map;
- perform a new passage of the process step on the technical plant and detect currently manipulated variables, measured values, decision variables and measurable disturbance variables;
- determine, for each temporal sub-step of the newly executed process step, a node of the at least one self-organizing map corresponding to a respective temporal sub-step via a distance measure and via a Dynamic Time Warping method; and
- compare the newly executed process step with the at least one self-organizing map, to determine whether each temporal sub-step of the newly executed process step is within a tolerance range of the respective corresponding node.

2. A method for monitoring a technical plant, historical data of a process step having previously been repeatedly executed on the technical plant being retrievable and evaluatable, and the process step includes a plurality of temporal sub-steps, comprising:
a) acquiring manipulated variables, measured values, decision variables and measurable disturbance variables which are tapable as historical data of the technical plant with a framework of completed passes of the process step;
b) learning previously acquired data in at least one self-organizing map, nodes of the at least one self-organizing map representing individual temporal sub-steps during a pass of the process step;
c) determining a tolerance range for the manipulated variables, measured values, decision variables and measurable disturbance variables for each node of the at least one self-organizing map;
d) performing a new passage of the process step on the technical plant and detecting currently manipulated variables, measured values, decision variables and measurable disturbance variables;
e) determining, for each temporal sub-step of the newly executed process step, a node of the at least one self-organizing map corresponding to a respective temporal sub-step via a distance measure and via a Dynamic Time Warping method; and
f) comparing the newly executed process step with the at least one self-organizing map, to determine whether each temporal sub-step of the newly executed process step is within a tolerance range of the respective corresponding node.

3. The method as claimed in claim 2, wherein the tolerance range is determined in an automated manner such that all historical data used for the training of the self-organizing map lies within the tolerance range.

4. The method as claimed in claim 2, wherein the technical plant is a process plant.

5. A non-transitory computer readable storage medium encoded with a computer program, which when executed by a computer causes for monitoring of a technical plant, the computer program comprising:
a) program code for acquiring manipulated variables, measured values, decision variables and measurable disturbance variables which are tapable as historical data of the technical plant with a framework of completed passes of the process step;
b) program code for learning previously acquired data in at least one self-organizing map, nodes of the at least one self-organizing map representing individual temporal sub-steps during a pass of the process step;
c) program code for determining a tolerance range for the manipulated variables, measured values, decision variables and measurable disturbance variables for each node of the at least one self-organizing map;
d) program code for performing a new passage of the process step on the technical plant and detecting the current manipulated variables, measured values, decision variables and measurable disturbance variables;
e) program code for determining, for each temporal sub-step of the newly executed process step, a node of the at least one self-organizing map corresponding to a respective temporal sub-step via a distance measure and via a Dynamic Time Warping method; and
f) program code for comparing the newly executed process step with the at least one self-organizing map, to determine whether each temporal sub-step of the newly executed process step is within a tolerance range of the respective corresponding node.

* * * * *